(12) United States Patent
Gaffe et al.

(10) Patent No.: US 7,052,051 B2
(45) Date of Patent: May 30, 2006

(54) QUICK-COUPLING DEVICE FOR MALE AND FEMALE MEMBERS AND ASSEMBLY FORMING A BRAKE FLUID RESERVOIR EQUIPPED WITH THIS DEVICE

(75) Inventors: Francois Gaffe, Rosny sous Bois (FR); Remi Demerssemann, Paris (FR); Philippe Come, Senlis (FR)

(73) Assignee: Robert Bosch GmbH, Stuttgart (DE)

( * ) Notice: Subject to any disclaimer, the term of this patent is extended or adjusted under 35 U.S.C. 154(b) by 136 days.

(21) Appl. No.: 10/674,138

(22) Filed: Sep. 29, 2003

(65) Prior Publication Data

US 2004/0057778 A1 Mar. 25, 2004

(51) Int. Cl.
*F16L 37/00* (2006.01)
*F16L 39/00* (2006.01)

(52) U.S. Cl. ............. 285/308; 285/305; 285/124.1; 285/124.3; 285/124.4

(58) Field of Classification Search ........... 285/305, 285/308, 320, 87, 88, 124.1, 124.2, 124.3, 285/124.4, 124.5
See application file for complete search history.

(56) References Cited

U.S. PATENT DOCUMENTS

| | | | | |
|---|---|---|---|---|
| 3,167,335 A | * | 1/1965 | Maisch | 285/317 |
| 4,804,213 A | * | 2/1989 | Guest | 285/308 |
| 5,026,099 A | * | 6/1991 | Hendrix | 285/315 |
| 5,201,552 A | * | 4/1993 | Hohmann et al. | 285/124.4 |
| 5,323,808 A | * | 6/1994 | Shimizu | 137/594 |
| 5,332,268 A | * | 7/1994 | Godeau et al. | 285/26 |
| 5,464,256 A | * | 11/1995 | Godeau | 285/26 |
| 5,468,024 A | * | 11/1995 | Carman et al. | 285/81 |
| 5,507,529 A | * | 4/1996 | Martins | 285/26 |
| 5,568,946 A | * | 10/1996 | Jackowski | 285/38 |
| 6,634,678 B1 | * | 10/2003 | Mariman | 285/308 |
| 6,688,331 B1 | * | 2/2004 | Demersseman et al. | 137/571 |
| 2003/0193188 A1 | * | 10/2003 | Miros | 285/124.5 |

FOREIGN PATENT DOCUMENTS

FR 2844333 A1 * 3/2004

* cited by examiner

*Primary Examiner*—James M. Hewitt
(74) *Attorney, Agent, or Firm*—Leo H. McCormick, Jr.; Warren Comstock

(57) ABSTRACT

A quick-coupling device having a support (18) on which a female member (20) is mounted in a manner to move between a position of retaining a male member (14E) in a position fitted into the female member (20) to a position of releasing the male member (14E) from the female member (20). This device has a lever (24) articulated to the support (18) between a rest position, wherein the lever (24) is separated from the female member (20), to a position of collaboration that allows the female member (20) to be driven toward a position to allow the male member (14E) to be released. The lever (24) includes structure (26) for guiding the male member (14E) in such a way as to encourage guidance of the male member (14E) to mate with the female member (20) when the lever (24) is in the rest position.

17 Claims, 4 Drawing Sheets

QUICK-COUPLING DEVICE FOR MALE AND FEMALE MEMBERS AND ASSEMBLY FORMING A BRAKE FLUID RESERVOIR EQUIPPED WITH THIS DEVICE

The present invention relates to a quick-coupling device for male and female members and to an assembly forming a brake fluid reservoir equipped with this device.

BACKGROUND OF THE INVENTION

A quick-coupling device for male and female members, of the type comprising a support on which the female member is mounted such that it can move between a position of retaining the male member in a position fitted into the female member and a position of releasing the male member from the female member, is already known from the prior art, particularly from FR-A-2 810 005 (FR-00 08616) or FR-A-2 810 097 (FR-00 07966).

A quick-coupling device of the aforementioned type is advantageously used in an assembly forming a brake fluid reservoir for a motor vehicle braking system. This assembly generally comprises a receptacle of brake fluid connected to at least one brake fluid pipe. In FR-A-2 810 005 (FR-00 08616) or FR-A-2 810 097 (FR-00 07966), the pipe is connected to the receptacle by a device of the aforementioned type, the female member support being integral with the receptacle.

During certain maintenance operations, the pipe needs to be detached from the receptacle. Separating the male and female members of the quick-coupling device is usually performed using a special tool, separate from this coupling device, as described in FR-A-2 810 005 (FR-00 08616) or FR-A-2 810 097 (FR-00 07966).

SUMMARY OF THE INVENTION

It is a particular object of the invention to avoid recourse to a special tool for separating the male and female members of the aforementioned quick-coupling device, and to do so while at the same time allowing the male and female members to be separated even when the quick-coupling device is relatively difficult to access.

To this end, the subject of the invention is a quick-coupling device for male and female members, of the aforementioned type, characterized in that it comprises a lever articulated to the support between a rest position, separated from the female member, and a position of collaboration with the female member, allowing this female member to be driven toward its position in which it releases the male member.

According to other features of this device:

the lever comprises means for guiding the male member, these being positioned on this lever in such a way as to encourage the guidance of the male member to mate it with the female member when the lever is in the rest position; the means for guiding the male member comprise a guide eye delimited by an annular surface converging toward the female member when considering the lever in the rest position;

the lever is of the second kind and comprises a first end articulated about a geometric axis associated with the support, a second end for the application of an operating force and an active part for collaboration with the female member inserted between the first and second ends of the lever;

the device comprises means of elastically returning the lever to a position in which the lever is separated from the female member;

the device comprises releasable means of retaining the lever in the rest position, these opposing the elastic force of the means of returning the lever;

the retaining means comprise complementary trapping members borne by the support and the lever, allowing the lever some excursion between its rest position and its position of collaboration with the female member;

the retaining means comprise a trapping member borne by the support and equipped with two branches roughly parallel to the direction of excursion of the lever, collaborating with a trapped member borne by the lever, the retaining means being releasable by parting the branches of the trapping member;

the lever is connected to the support by a tab formed as an integral part of this lever and this support, forming a hinge for the articulation of the lever;

the tab forms the means of elastically returning the lever;

the lever is connected to the support by hinge-forming means comprising two parts, one fixed and one moving, forming hinge leaves formed respectively on the support and on the lever, these fixed and moving parts being articulated to one another by a pin;

the means of elastically returning the lever comprise a spring-forming member working in compression, inserted between the lever and the support;

the spring-forming member comprises an elastically deformable bow equipped with two ends secured to the lever and with an intermediate part for contact with the support;

the device is intended to connect two male members to two female members, the support bearing the two female members and the lever being intended to collaborate with both female members simultaneously;

the lever is intended to collaborate with an end flange of the female member; and the male member forms a pipe endpiece formed as an integral part of or attached to this pipe.

Another subject of the invention is an assembly forming a brake fluid reservoir for a motor vehicle braking system, of the type comprising a brake fluid receptacle connected to at least one brake fluid pipe, characterized in that the pipe is connected to the receptacle by a quick-coupling device as defined hereinabove, the support of the female member being integral with the receptacle.

The invention will be better understood from reading the description which will follow, given solely by way of example and made with reference to the drawings.

DETAILED DESCRIPTION OF THE INVENTION

Figure 1:
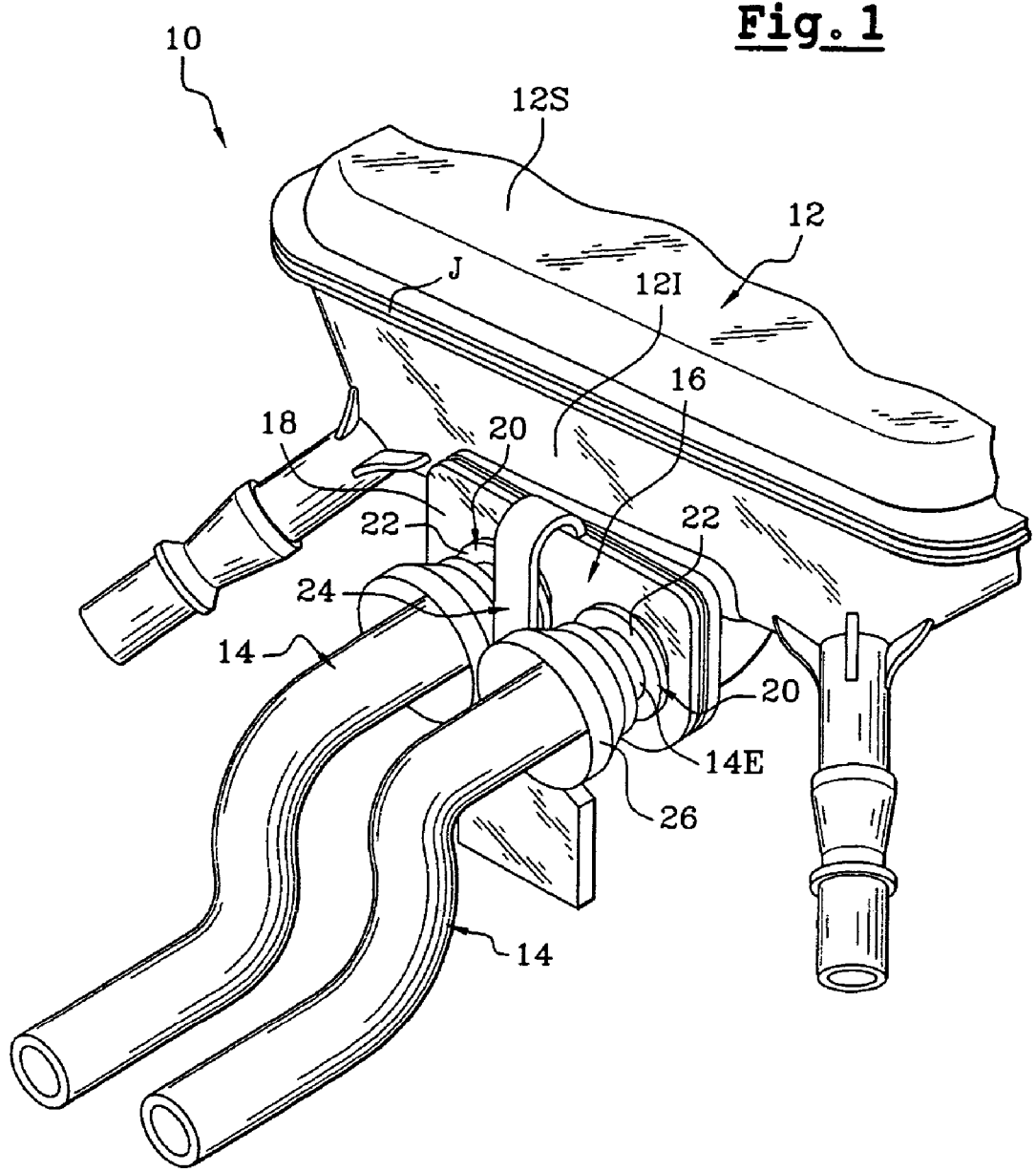
FIG. 1 is a perspective view of an assembly forming a brake fluid reservoir, according to the invention.

FIG. 1 depicts an assembly forming a brake fluid reservoir for a motor vehicle braking system. This assembly, according to the invention, is denoted by the general reference 10. The assembly 10 comprises a brake fluid receptacle 12 delimited, for example, by two half-shells, namely a lower one 12I and an upper one 12S. The two half-shells 12I, 12S, preferably made of plastic, are equipped with complementary joining edges, delimiting a parting line J. The receptacle 12 is connected to two brake fluid pipes 14 by a quick-coupling device 16 according to the invention.

FIGS. 1 to 4 depict the quick-coupling device 16 according to a first embodiment of the invention. The pipes 14 are not depicted in FIGS. 2 to 4 for reasons of clarity. The device 16 comprises a support 18, preferably made of plastic, fixed in a way known per se to the receptacle 12, for example by bonding or welding. The support 18 bears two female members 20, associated with two pipes 14 respectively, each equipped with an end flange 22 projecting outside the receptacle 12. Each pipe 14 is equipped with an end or endpiece 14E formed as an integral part of or attached to the pipe 14. The endpiece 14E forms a male member intended to fit into the corresponding female member 20.

The female members 20, mutually identical, are of a conventional type such as the one marketed by JOHN GUEST or illustrated in FR-A-2 810 005 and FR-A-2 810 097.

Figure 2:
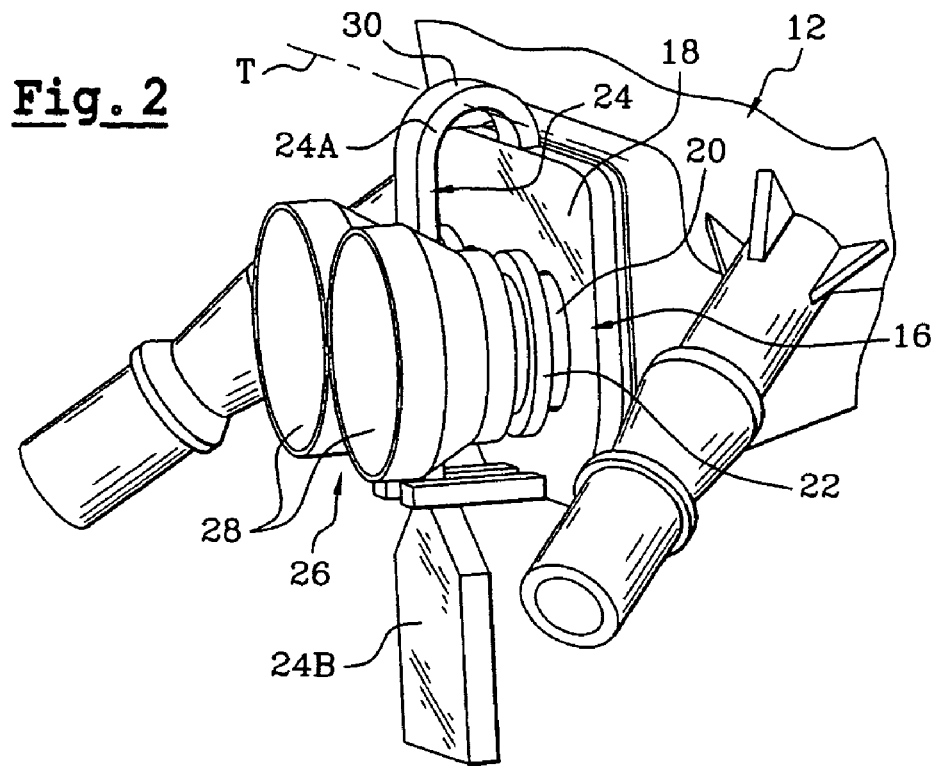
FIGS. 2 to 4 are perspective views of a quick-coupling device according to a first embodiment of the invention, equipping the assembly illustrated in FIG. 1, these FIGS. 2 to 4 showing the device in three configurations of use respectively.
Figure 3:
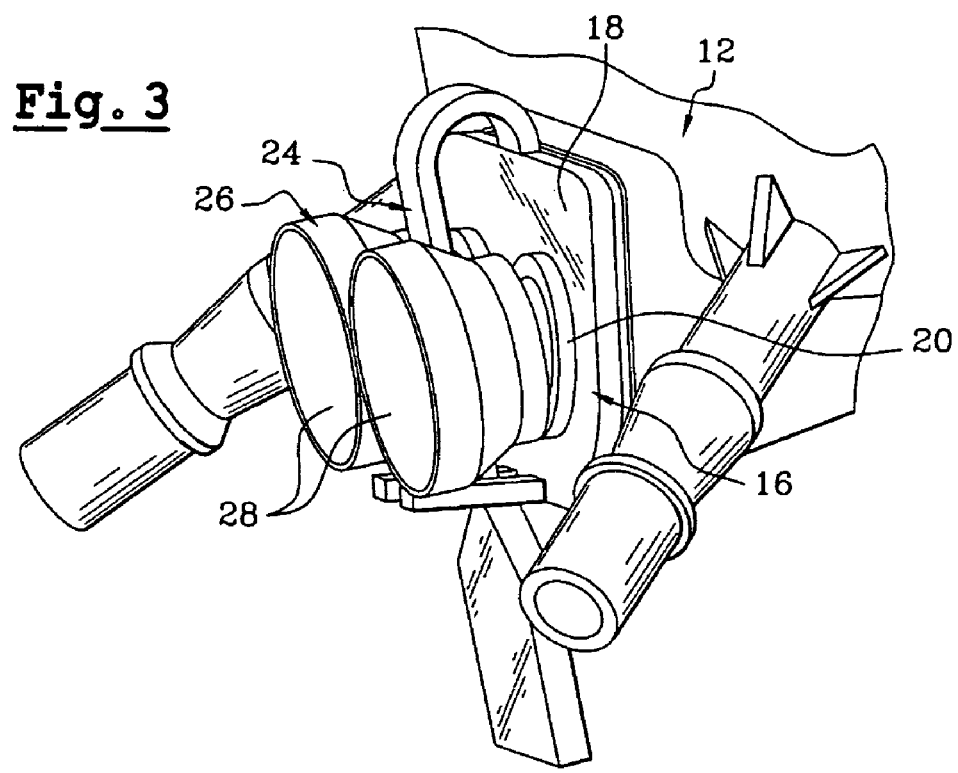

According to a conventional operation of the female member 20, the latter is mounted on the support 18 such that it can move between a position of retaining the endpiece 14E of the corresponding pipe in a position fitted into the female member 20, as depicted in FIGS. 1 and 2, and a position in which the endpiece 14E is released from the female member 20, as depicted in FIG. 3.

The quick-coupling device 16 comprises a lever 24 articulated to the support 18. It will be remembered that a lever is a simple machine of which there are generally three kinds. A lever is said to be of the first kind, or intermobile, when the axis of articulation of this lever (fulcrum) is placed between, on the one hand, a part for operating this lever, to which a lever-operating force (or power) is applied and, on the other hand, an active part of this lever, on which a resistive force is exerted. A lever the second kind is inter-resistive, when the active part of this lever is placed between the axis of articulation and the operating part of the lever. Finally, a lever of the third kind is interpowerful, when the operating part of this lever is placed between the axis of articulation and the active part of this lever. The lever 24 comprises means 26 for guiding the two pipe endpieces 14E.

Referring to FIGS. 1 to 3, it can be seen that the lever 24 is articulated to the support 18 between at least one rest position, separated from the female members 20, as depicted in FIGS. 1 and 2, and a position of collaboration with the two female members 20 simultaneously, as depicted in FIG. 3. This position of collaboration allows each female member 20 to be driven toward its position of releasing the corresponding pipe endpiece 14E.

Referring more specifically to FIGS. 1 and 2, it can be seen that the guide means 26 are positioned on the lever 24 in such a way as, considering the lever 24 to be in the rest position, to encourage guidance of the pipe endpieces 14E to mate them with the corresponding female members 20.

The guide means 26 comprise two guide eyes 28 for guiding the two corresponding pipe endpieces 14E. Each guide eye 28 is delimited by an annular surface converging toward the corresponding female member 20, when considering the lever 24 in the rest position (see FIG. 2).

Referring especially to FIGS. 2 and 3, it can be seen that the lever 24 is of the second kind and comprises a first end 24A articulated about a geometric axis T associated with the support 18, a second end 24B for the application of an operating force for operating this lever and an active part, formed by the eyes 28, for collaborating with the two female members 20. This active part is inserted between the first 24A and second 24B ends of the lever.

Figure 4:
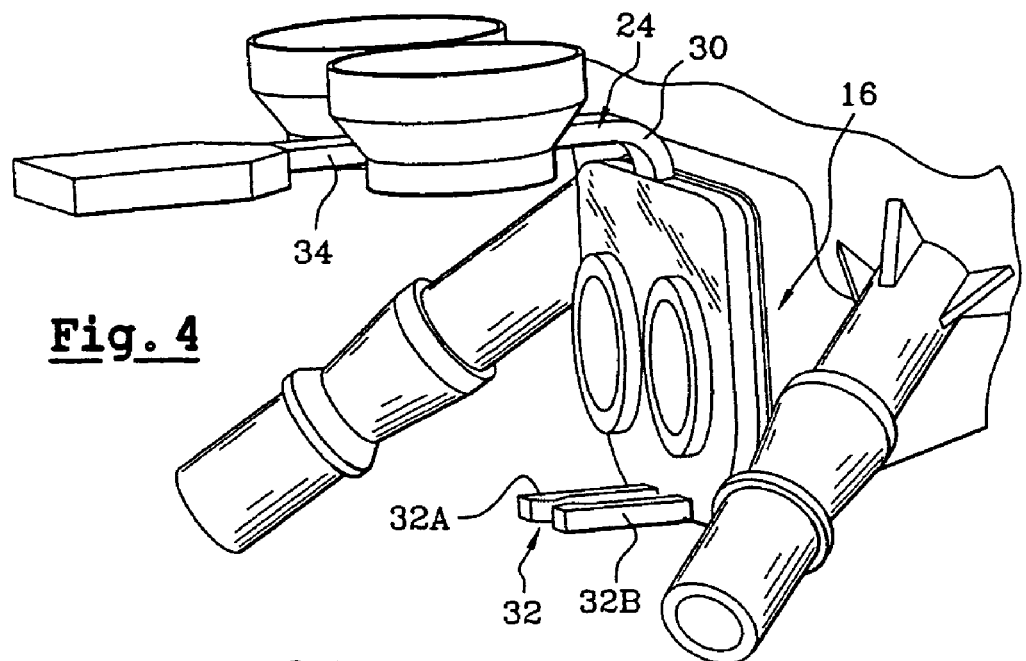

In the first embodiment of the quick-coupling device 16 which is illustrated in FIGS. 1 to 4, the lever 24 is connected to the support 18 by a tab 30, formed as an integral part of this lever 24 and this support 18. The tab 30 forms a hinge articulating the lever about the axis T. The tab 30 also forms a means of elastically returning the lever 24 to a position in which this lever 24 is separated from the female members 20, as depicted in FIG. 4.

The quick-coupling device 16 further comprises a trapping member 32, borne by the support 18, equipped with two branches 32A, 32B intended to collaborate with a trapped member 34 formed on the lever 24. These complementary trapping members 32, 34 form releasable means of retaining the lever 24 in the rest position, opposing the elastic return force of the tab 30. The trapped member 34 can be released from the trapping member 32 by parting the branches 32A, 32B of this trapping member. The trapping member 32 allows the lever 24 some excursion between its position of rest and its position of collaboration with the female members 20. It will be noted that the branches 32A, 32B of the trapping member are roughly parallel to the direction of excursion of the lever 24.

The main aspects in the operation of the quick-coupling device 16, associated with the invention, will be specified hereinbelow. Initially, the lever 24 is in its rest position, as illustrated in FIG. 4. The trapping member 32 collaborates with the trapped member 34 in such a way as to retain the lever 24 in its rest position. The guide eyes 28 are more or less aligned with the female members 20.

To couple the pipes 14 to the receptacle 12, all that is required is for the endpiece 14E of each pipe to be fitted into the corresponding eye 28 and the corresponding female member 20. This fitting-together action, facilitated by the guidance of each pipe 14 by the corresponding eye 28 causes automatic coupling of the endpiece 14E with the corresponding female member 20 according to the conventional operation of the latter.

If, during a maintenance operation, the pipes 14 need to be detached from the receptacle 12, an operator grasps the operating end 24B of the lever to move this lever 24 to its position of collaboration with the female members 20, as depicted in FIG. 3, in which each female member 20 is driven toward its position of release of the corresponding pipe endpiece 14E.

Separating the pipe endpieces 14E from the female members 20 therefore requires the use of no special tools.

Furthermore, it will be noted that the user can feel his way to grasping the operating end 24B of the lever, thus allowing the pipe endpieces 14E to be detached from the female members 20 even when the quick-coupling device 16 is relatively difficult to access.

Figure 5:
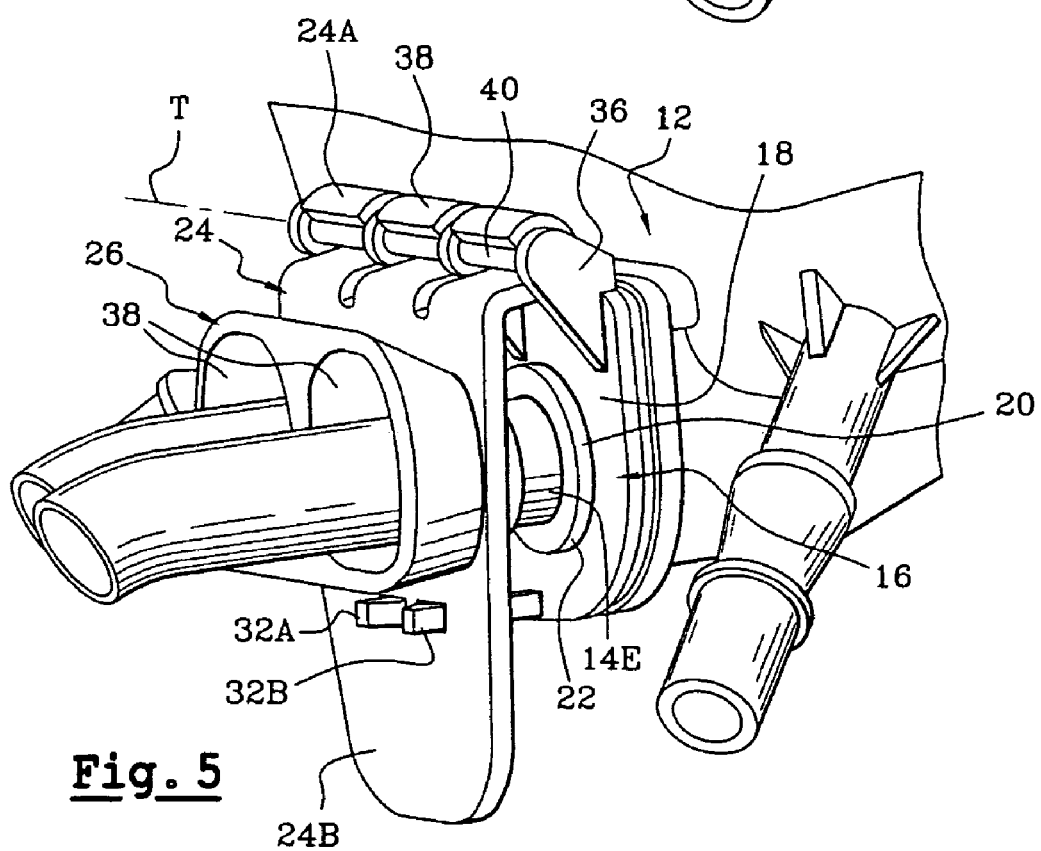
FIGS. 5 to 7 are views roughly analogous to those of FIGS. 2 to 4 showing a quick-coupling device according to a second embodiment of the invention.
Figure 6:
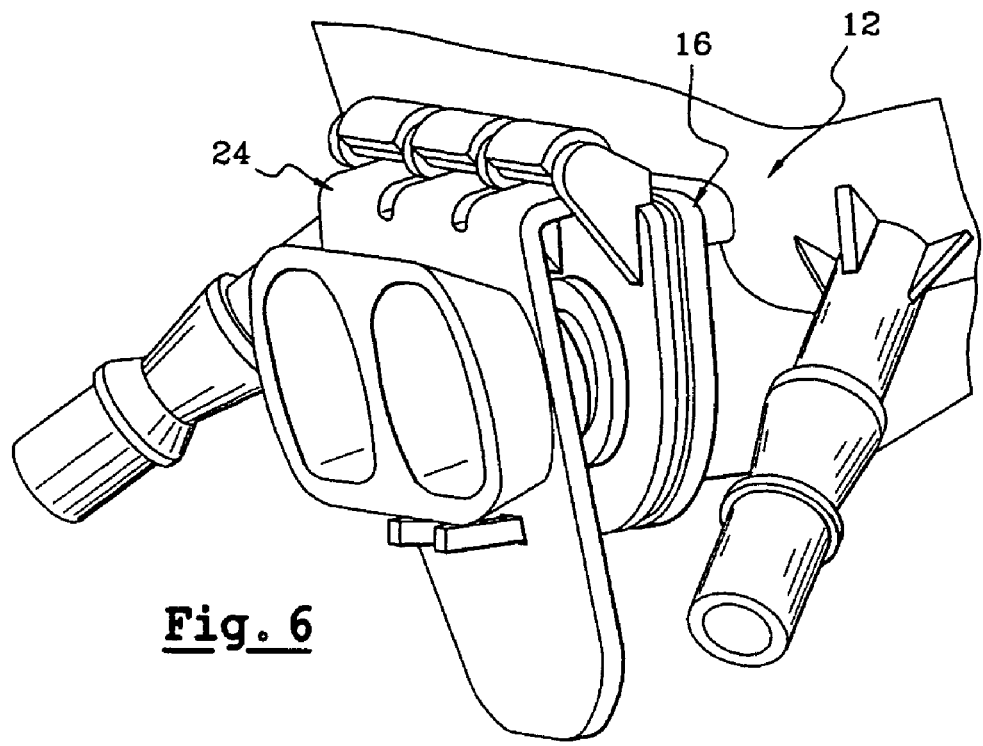
Figure 7:
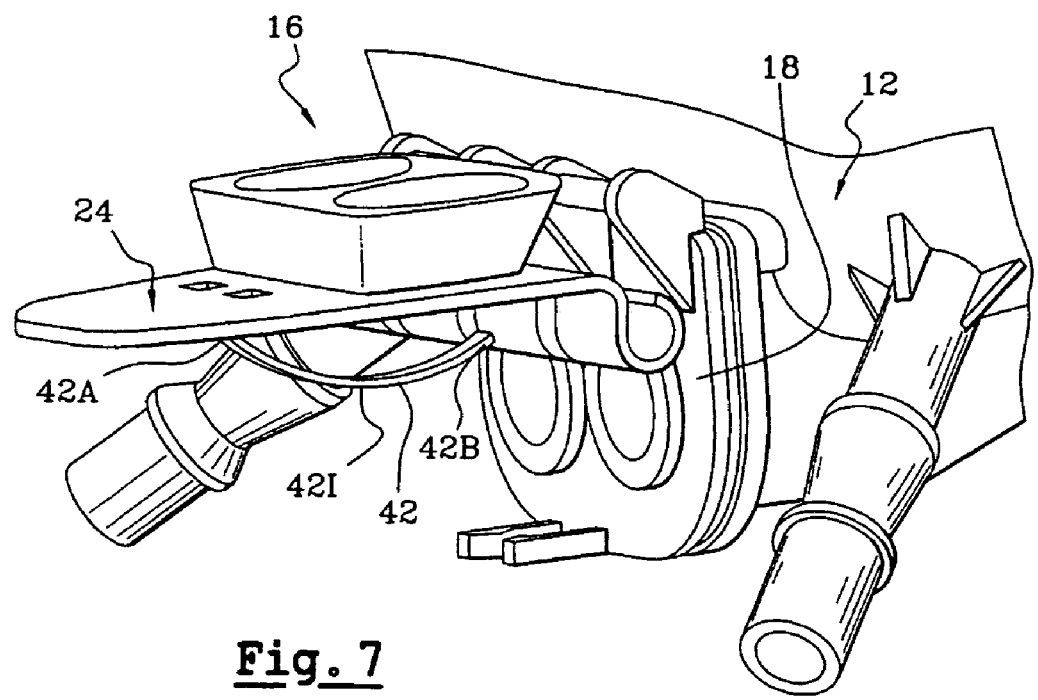

FIGS. 5 to 7 depict a quick-coupling device 16 according to a second embodiment of the invention. In these figures, the elements analogous to those of FIGS. 1 to 4 are denoted by the same references.

In this case, the lever 24 is connected to the support 18 by hinge-forming means comprising two parts, one fixed 36 and one moving 38, forming hinge leaves. The fixed part 36 is formed on the support 18. The moving part 38 is formed on the lever 24. The fixed 36 and moving 38 parts are articulated to one another by a pin 40 embodying the axis T.

Furthermore, the lever 24 is elastically returned to a position of separation of this lever 24 from the female members 20 by a spring-forming member inserted between the lever 24 and the support 18. As a preference, the spring-forming member consists of an elastically deformable bow 42 equipped with two ends 42A, 42B secured to the lever 24 and with an intermediate part 42I for contact with the support 18. The bow 42 is intended to work in compression between the support 18 and the lever 24.

The way in which the quick-coupling device 16 according to the second embodiment works is the same as the device 16 according to the first embodiment of the invention.

The invention is not restricted to the embodiments described hereinabove.

In particular, although the quick-coupling devices 16 illustrated in the figures are intended to connect two male members to two female members, the invention may be applied to couplings of just one male member to a corresponding female member.

We claim:

1. A quick-coupling device for male (14E) and female (20) members comprising a support (18) on which the female member (20) is mounted such that it can move between a position of retaining the male member (14E) in a position fitted into the female member (20) and a position of releasing the male member (14E) from the female member (20), characterized in that the device comprises a lever (24) articulated to the support (18) between a rest position, wherein the lever is separated from the female member (20), and a position of collaboration with the female member (20), allowing the female member (20) to be driven toward its position in which it releases the male member (14E).

2. The device according to claim 1, characterized in that the lever (24) comprises means (26) for guiding the male member (14E), these being positioned on the lever (24) in such a way as to encourage guidance of the male member (14E) to mate with the female member (20) when the lever (24) is in the rest position.

3. The device according to claim 2, characterized in that the means (26) for guiding the male member (14E) comprise a guide eye (28) delimited by an annular surface converging toward the female member (20) with the lever (24) in the rest position.

4. The device according to claim 3, characterized in that the lever (24) comprises a first end (24A) articulated about a geometric axis (T) associated with the support (18) and a second end (24B) for the application of an operating force and the guide eye (28) for collaboration with the female member (20) when the female member (20) is inserted between the first (24A) and second (24B) ends of the lever (24).

5. The device according to claim 4, further characterized by means (30) for elastically returning the lever (24) to a position in which the lever (24) is separated from the female member (20).

6. The device according to claim 5, further characterized by releasable means (32, 34) for retaining the lever (24) in the rest position, said retaining means opposing the elastic force of the means (30) of returning the lever (24).

7. The device according to claim 6, characterized in that the retaining means comprise complementary trapping members (32, 34) borne by the support (18) and the lever (24), allowing the lever (24) some excursion between its rest position and its position of collaboration with the female member (20).

8. The device according to claim 7, characterized in that a trapping member (32) borne by the support (18) and equipped with two branches (32A, 32B) is roughly parallel to the direction of excursion of the lever (24), collaborates with one of said trapping members (32,34) borne by the lever (24), said retaining means being releasable by parting the branches (32A, 32B) of the trapping member.

9. The device according to claim 6, characterized in that the lever (24) is connected to the support (18) by a tab (30) formed as an integral part of the lever (24) and the support (18), forming a hinge for the articulation of the lever (24).

10. The device according to claim 9, characterized in that the tab (30) forms the means of elastically returning the lever (24).

11. The device according to claim 3, characterized in that the lever (24) is connected to the support (18) by hinge-forming means comprising two parts, one fixed (36) and one moving (38), forming hinge leaves formed respectively on the support (18) and on the lever (24), these fixed (36) and moving (38) parts being articulated to one another by a pin (40).

12. The device according to claim 11, characterized in that a means of elastically returning the lever (24) comprise a spring-forming member (42) working in compression, inserted between the lever (24) and the support (18).

13. The device according to claim 12, characterized in that the spring-forming member (42) comprises an elastically deformable bow equipped with two ends (42A, 42B) secured to the lever (24) and with an intermediate part (42I) for contact with the support (18).

14. The device according to claim 13, for connecting two male members (14E) to two female members (20) wherein the support (18) bears the two female members (20) and the lever (24) simultaneously collaborates with said female members (20).

15. The device according to claim 14, characterized in that the lever (24) collaborates with end flanges (22) of the female members (20).

16. The device according to claim 15, characterized in that each male member (14E) forms a pipe endpiece formed as an integral part of or attached to this pipe.

17. An assembly forming a brake fluid reservoir for a motor vehicle braking system comprising a brake fluid receptacle (12) connected to at least one brake fluid pipe (14), characterized in that the pipe endpiece is connected to said receptacle (12) by a quick-coupling device (16) according to claim 16 and the support (18) of the female member (20) is integral with the receptacle (12).

* * * * *